United States Patent
Chang (10) Patent No.: US 12,547,243 B2
(45) Date of Patent: Feb. 10, 2026

(54) ADAPTIVE CURSOR CONTROL

(71) Applicant: Hewlett-Packard Development Company, L.P., Spring, TX (US)

(72) Inventor: Che-Chia Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/338,877

(22) Filed: Jun. 21, 2023

(65) Prior Publication Data
US 2024/0427415 A1   Dec. 26, 2024

(51) Int. Cl.
*G06F 3/01* (2006.01)
*G06T 7/33* (2017.01)

(52) U.S. Cl.
CPC .............. *G06F 3/013* (2013.01); *G06F 3/012* (2013.01); *G06T 7/33* (2017.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 5,689,619 | A * | 11/1997 | Smyth | G02B 27/0093 706/45 |
| 9,632,655 | B2 | 4/2017 | Fotland | |
| 9,880,631 | B2* | 1/2018 | Pandey | G06F 3/017 |
| 9,910,512 | B1* | 3/2018 | Tiwary | G06F 3/038 |
| 2013/0074013 | A1 | 3/2013 | Tapiola et al. | |
| 2013/0090931 | A1* | 4/2013 | Ghovanloo | A61F 4/00 704/275 |
| 2019/0033964 | A1* | 1/2019 | Kulkarni | G06F 3/04842 |
| 2022/0011927 | A1* | 1/2022 | Sun | H04R 3/04 |
| 2023/0015224 | A1 | 1/2023 | Lin et al. | |
| 2024/0211034 | A1* | 6/2024 | Ye | G06F 3/013 |

FOREIGN PATENT DOCUMENTS

| | | |
|---|---|---|
| KR | 10-2133018 B1 | 7/2020 |
| WO | 2018/176317 A1 | 10/2018 |

* cited by examiner

*Primary Examiner* — Andre L Matthews
(74) *Attorney, Agent, or Firm* — Quarles & Brady LLP (57) ABSTRACT

Systems and methods are provided for implementing adaptive cursor control. One system may include a camera to detect an image data stream including a feature of a user. The system may also include an electronic processor to detect, via a feature tracking model that receives the image data, a change in a position of the feature. The electronic processor may also, in response to detecting the change in the position of the feature, determine a control parameter for a cursor displayed to the user. The electronic processor may also control the cursor displayed to the user using the control parameter.

15 Claims, 7 Drawing Sheets

FIG. 1

| Games | Cursor speed |
|---|---|
| Default | Adaptive mode |
| Apex | 4500 |
| League of Legends | Adaptive mode |
| Cyberpunk 2077 | 3500 |
| Minecraft | 3000 |

ADAPTIVE CURSOR CONTROL

BACKGROUND

During operation of a computer, a user (or consumer) may interact with user applications that perform or provide various functions or services to the user. A user application may include, e.g., a productivity application, a gaming application, a streaming application, etc. The user may use a cursor control device (e.g., a mouse) to interact or engage with such functions or services using a cursor displayed to the user.

The discussion above is merely provided for general background information and is not intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

As described above, a user (or consumer) may interact with user applications that perform or provide various functions or services to the user. A user application may include, e.g., a productivity application, a gaming application, a streaming application, etc. The user may use a cursor control device (e.g., a mouse) to interact or engage with such functions or services using a cursor displayed to the user. Some cursors are controlled using a set of control parameters, including, e.g., a fixed cursor speed or sensitivity.

The technology disclosed herein provides technical advantages and solutions to technical problems associated with fixed cursor speed or sensitivity. For instance, the technology disclosed herein provides for dynamic cursor speed. In some examples, the technology disclosed herein dynamically adjusts cursor speed based on cursor position, which may result in more efficient and accurate cursor movement as compared to fixed cursor speed solutions. Additionally, the technology disclosed herein provides for cursor control optimization for specific user applications, such as, e.g., game mode optimization. In some examples, the technology disclosed herein addresses the issue of inconsistent cursor speed in different gaming applications by allowing for specific cursor speed settings for each gaming application and automatically adjusting mouse DPI when switching between gaming application. This is advantageous over solutions that only allow for general cursor speed adjustments, or solutions that fail to contemplate such a game mode optimization. Additionally, the technology disclosed herein provides for an improved user experience with respect to controlling cursor speed. For instance, the technology disclosed herein is readily understood and implemented by users, regardless of how much technical knowledge a user may have.

Accordingly, in some examples, the technology disclosed herein provides systems and methods for optimizing cursor movement on large screens. The system may detect user intent by monitoring head orientation, eyeball movement, and distance from the screen. The system may dynamically adjust cursor speed based on the detected user intent. In one embodiment, the system may utilize head pose estimation (e.g., image data collected via a camera, such as a webcam) to detect changes in head pose, which may trigger an adjustment in cursor speed (e.g., increased cursor speed). For example, the system may boost cursor speed when there is a large head pose change and may set a basic cursor speed when there is not a large head pose change. The system may reset the cursor speed to the basic speed once the head pose movement is complete. In some embodiments, the system may utilize eye gaze estimation to detect a user's intent and dynamically adjust cursor speed based on an eye gaze of the user. Additionally, in some instances, the system may dynamically adjust cursor speed based on what application a user is interacting with.

In some examples, the technology disclosed herein provides a system. The system can include a camera to detect an image data stream including a feature of a user. The system may also include an electronic processor. The electronic processor may detect, via a feature tracking model that receives the image data, a change in a position of the feature. The electronic processor may also, in response to detecting the change in the position of the feature, determine a control parameter for a cursor displayed to the user. The electronic processor may also control the cursor displayed to the user using the control parameter.

In some examples, the technology disclosed herein provides a method. The method can include receiving, via a camera, image data that includes a feature of a user; detecting, via a feature tracking model that receives the image data, a change in a position of the feature; in response to detecting the change in the position of the feature, determining a control parameter for a cursor displayed to the user, wherein the control parameter includes a speed parameter; and controlling, by a processor, the cursor displayed to the user using the control parameter.

In some examples, the technology disclosed herein provides a non-transitory computer-readable medium storing instructions that, when executed by an electronic processor, may cause the electronic processor to receive, via a camera, image data that includes a feature of a user; identify an active application being executed; detect, via a feature tracking model that receives the image data, a change in a position of the feature; in response to detecting the change in the position of the feature, determine, based on the active application, a control parameter for a cursor displayed to the user, wherein the control parameter includes a speed parameter; and control the cursor displayed to the user using the control parameter.

Figure 1:
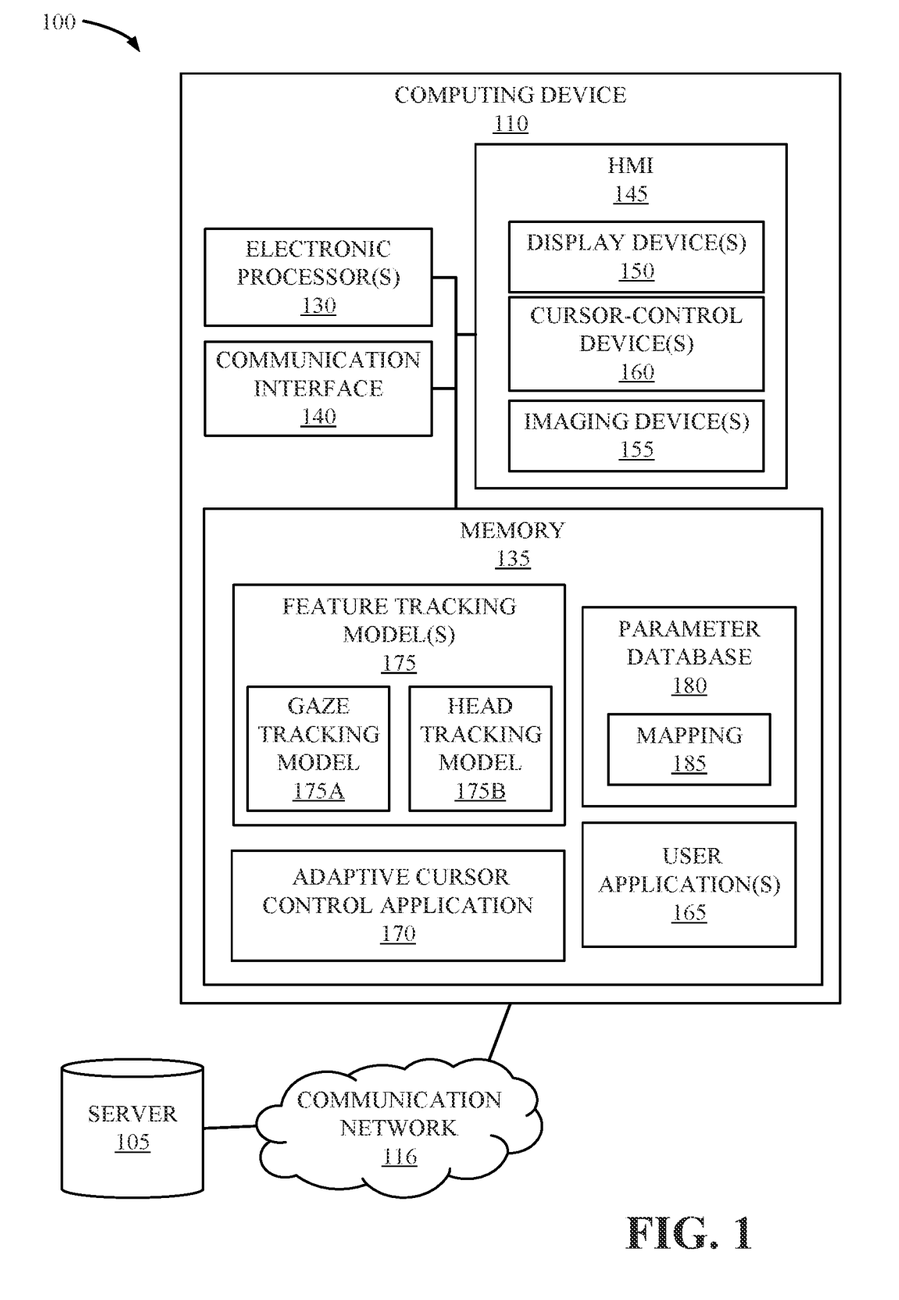
FIG. 1 schematically illustrates a system for implementing adaptive cursor control according to some examples.

FIG. 1 illustrates a system 100 for implementing adaptive cursor control according to some examples. As illustrated in the example of FIG. 1, the system 100 can include a server 105 and a computing device 110. In some examples, the system 100 can include fewer, additional, or different components in different configurations than illustrated in FIG. 1. For example, as illustrated, the system 100 includes one server 105 and one computing device 110. However, in some examples, the system 100 can include fewer or additional servers 105, computing devices 110, or a combination thereof. As another example, one or more components of the system 100 can be combined into a single device, divided among multiple devices, or a combination thereof.

The server 105 and the computing device 110 can communicate over one or more wired or wireless communication networks 116. Portions of the communication networks 116 can be implemented using a wide area network, such as the Internet, a local area network, such as a Bluetooth™ network or Wi-Fi, and combinations or derivatives thereof. In some examples, the communication network 116 represents a direct wireless link between two components of the system 100 (e.g., via a Bluetooth™ or Wi-Fi link). Alternatively, or in addition, in some examples, two or more components of the system 100 can communicate through one or more intermediary devices of the communication network 116 not illustrated in FIG. 1.

The computing device 110 can include, e.g., a desktop computer, a laptop computer, a tablet computer, an all-in-one computer, a notebook computer, a terminal, a smart telephone, a smart television, or another suitable computing device that interfaces with a user. As described in greater detail herein, the computing device 110 can be used by a user for interacting with one or more user applications (e.g., a communication application, a productivity application, a gaming application, etc.).

As illustrated in FIG. 1, the computing device 110 includes an electronic processor 130, a memory 135, a communication interface 140, and a human-machine interface ("HMI") 145. The electronic processor 130, the memory 135, the communication interface 140, and the HMI 145 can communicate wirelessly, over one or more communication lines or buses, or a combination thereof. The computing device 110 can include additional, different, or fewer components than those illustrated in FIG. 1 in various configurations. The computing device 110 can perform additional functionality other than the functionality described herein. Also, the functionality (or a portion thereof) described herein as being performed by the computing device 110 can be performed by another component (e.g., the server 105, a remote computing device, another computing device, or a combination thereof), distributed among multiple computing devices (e.g., as part of a cloud service or cloud-computing environment), combined with another component (e.g., the server 105, a remote computing device, another computing device, or a combination thereof), or a combination thereof.

The communication interface 140 can include a transceiver that communicates with the server 105, another device of the system 100, another device external or remote to the system 100, or a combination thereof over the communication network 116 and, optionally, one or more other communication networks or connections. The electronic processor 130 includes a microprocessor, an ASIC, or another suitable electronic device for processing data, and the memory 135 includes a non-transitory, computer-readable storage medium. The electronic processor 130 is configured to retrieve instructions and data from the memory 135 and execute the instructions.

As illustrated in FIG. 1, the computing device 110 can also include the HMI 145 for interacting with a user. The HMI 145 can include one or more input devices, one or more output devices, or a combination thereof. Accordingly, in some examples, the HMI 145 allows a user to interact with (e.g., provide input to and receive output from) the computing device 110. For example, the HMI 145 can include a keyboard, a cursor-control device (e.g., a mouse), a touch screen, a scroll ball, a mechanical button, a display device (e.g., a liquid crystal display ("LCD")), a printer, a speaker, a microphone, or a combination thereof.

In the illustrated example of FIG. 1, the HMI 145 includes at least one display device 150 (referred to herein collectively as "the display devices 150" and individually as "the display device 150"). The display device 150 can provide (or output) one or more media signals to a user. As one example, the display device 150 can display a user interface (e.g., a graphical user interface (GUI)) associated with one or more user applications. The display device 150 can be included in the same housing as the computing device 110 or can communicate with the computing device 110 over one or more wired or wireless connections. As one example, the display device 150 can be a touchscreen included in a laptop computer, a tablet computer, or a smart telephone. As another example, the display device 150 can be a monitor, a television, or a projector coupled to a terminal, desktop computer, or the like via one or more cables.

The HMI 145 can also include at least one imaging device 155 (referred to herein collectively as "the imaging devices 155" and individually as "the imaging device 155"). The imaging device 155 can be a component associated with the computing device 110 (e.g., included in the computing device 110 or otherwise communicatively coupled with the computing device 110). In some examples, the imaging device 155 can be internal to the computing device 110 (e.g., a built-in webcam). Alternatively, or in addition, the imaging device 155 can be external to the computing device 110

(e.g., an external webcam positioned on a monitor of the computing device 110, on a desk, shelf, wall, ceiling, etc.).

The imaging device 155 can electronically capture or detect a visual image (as an image data signal or data stream). A visual image can include, e.g., a still image, a moving-image, a video stream, other data associated with providing a visual output, and the like. The imaging device 155 can include one or more cameras, such as, e.g., a webcam, an image sensor, or the like. For example, the imaging device 155 can detect image data associated with a physical surrounding or environment of the computing device 110. In some examples, the imaging device 155 may detect image data associated with a feature of a user using the computing device 110. A feature of a user may include, e.g., an eye, a mouth, a body, a head, a hand, a finger, a limb, etc.

In the illustrated example of FIG. 1, the HMI 145 includes at least one cursor-control device 160 (referred to herein collectively as "the cursor-control devices 160" and individually as "the cursor-control device 160"). The cursor-control device 160 may include, e.g., a mouse, a trackpad, a scroll ball, a mechanical button, etc. The cursor-control device 160 may be used to control a cursor displayed via the display device 150. As used herein, a cursor may generally refer to a graphical indicator or object that identifiers a point or position to be interacted with by input from the user. The cursor may generally move relative to input provided by a user via the cursor-control device 160. For example, when a user moves the cursor-control device 160 to the left, the cursor may also move to the left. Accordingly, the cursor-control device 160 may receive input from a user, where that input may be represented via a cursor displayed to the user via the display device 150.

As illustrated in FIG. 1, the memory 135 includes one or more user applications 165 (referred to herein individually as "the user application 165" and collectively as "the user applications 165"), an adaptive cursor control application 170 (also referred to herein as "the application 170"), one or more feature tracking models 175 (referred to herein individually as "the feature tracking model 175" and collectively as "the feature tracking models 175"), and a parameter database 180.

The user application 165 may be a software application executable by the electronic processor 130 in the example illustrated and as specifically discussed below, although a similarly purposed module can be implemented in other ways in other examples. When executed by the electronic processor 130, the user application(s) 165 may perform or provide a function or service to a user. A user application 165 may be, e.g., a word processing application, a task management application, a video editing application, a spreadsheet application, a presentation application, a video streaming application, a gaming application, a communication application, a video conferencing application, a collaboration application, an instant messaging application, a group call application, a productivity application, etc. A user may use the computing device 110 to interact or engage with a function or service provided via execution of the user application(s) 165. In some examples, a user may interact or engage with the user application 165 using the cursor-control device 160.

The application 170 may be a software application executable by the electronic processor 130 in the example illustrated and as specifically discussed below, although a similarly purposed module can be implemented in other ways in other examples. The electronic processor 130 can execute the application 170 to control a cursor displayed, via the display device 150, to a user of the computing device 110. In some examples, the electronic processor 130 may control the cursor by selecting or adjusting a control parameter for the cursor. In some examples, the control parameter for a cursor may include a sensitivity setting or parameter (e.g., cursor or pointer speed parameter). In some examples, the sensitivity setting is a dots per linear inch (DPI) value or metric. Alternatively, or in addition, in some examples, the control parameter may include, e.g., a primary button parameter, a secondary button parameter, a scroll parameter, a display parameter (e.g., a size, an effect, a color, a shape, etc.), a double-click speed parameter, a trail parameter, etc.

In some examples, the electronic processor 130 may execute the application 170 to dynamically adjust a cursor parameter, as described in greater detail herein. In some examples, the electronic processor 130 may adjust the cursor parameter based on user intent. User intent may be determined based on where a user is focusing their attention (e.g., where the user is looking, a task being performed by the user, etc.). In some examples, the electronic processor 130 may determine user intent by tracking at least one feature of the user, such as, e.g., a user's eye gaze, a user's head position, etc. The electronic processor 130 may determine user intent using the feature tracking model(s) 175. Accordingly, in some examples, the electronic processor 130 may access and execute (or implement) the feature tracking model(s) 175 in order to determine user intent. For example, as illustrated in FIG. 1, the feature tracking model 175 may be a gaze tracking model 175A (e.g., an eye tracking model). The gaze tracking model 175A (when executed by the electronic processor 130) may perform eye tracking techniques or functionality. For instance, the gaze tracking model 175A may determine a point of gaze (e.g., where a user is looking). Alternatively, or in addition, the gaze tracking model 175A may determine motion of an eye relative to the head. Accordingly, in some examples, the electronic processor 130 may implement the gaze tracking model 175A to determine a user intent based on a point of gaze, a motion of an eye relative to the head, or a combination thereof. As also illustrated in FIG. 1, the feature tracking model 175 may be a head tracking model 175B. The head tracking model 175B may monitor and track a head position of a user, such as, e.g., an angle or pose of a user's head. Accordingly, in some examples, the electronic processor 130 may implement the head tracking model 175B to determine a user intent based on a head position of the user.

As illustrated in FIG. 1, the memory 135 may also include the parameter database 180. The parameter database 180 may include a set of control parameters for controlling a cursor. As noted herein, a control parameter for a cursor may include, a sensitivity, a primary button selection, a secondary button selection, a scroll parameter, a display parameter, a double-click speed parameter, a trail parameter, etc. In some examples, the parameter database 180 may store the set of control parameters as a set of default control parameters.

Figure 2:
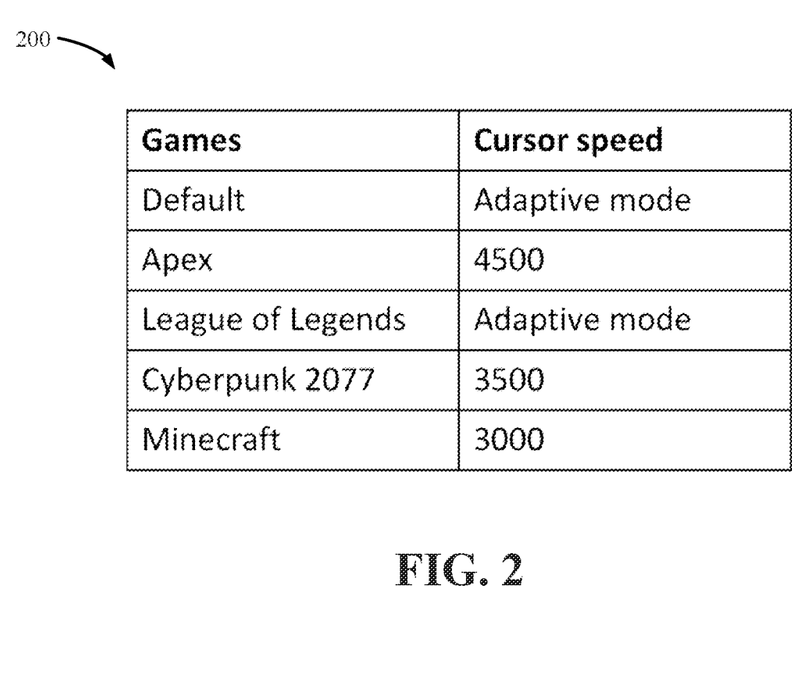
FIG. 2 schematically illustrates a table mapping user applications to control parameters according to some examples.

In some examples, as illustrated in FIG. 1, the parameter database 180 may include a mapping 185. The mapping 185 may associate at least one control parameter to a specific user application 165. As noted herein, a user may want different control parameters (e.g., different cursor speed or sensitivity settings) based on which of the user applications 165 the user is intending to interact with (e.g., based on user intent). For example, a user may want a first control parameter when interacting with a first user application and a second different control parameter when interacting with a second user application. The mapping 185 may be a look up table including a listing of user applications with corresponding cursor sensitivity settings. FIG. 2 illustrates an example table 200 including a list of games associated with a corresponding cursor sensitivity setting.

Returning to FIG. 1, the system 100 may also include the server 105. The server 105 may be a computing device. The server 105 may host or otherwise provide at least one dynamic cursor adjustment platform or environment. Accordingly, in some examples, the server 105 is associated with a dynamic cursor adjustment platform (e.g., included as a component, device, or subsystem of a system providing or hosting a dynamic cursor adjustment platform or service). Alternatively, or in addition, in some examples, the functionality (or a portion thereof) described herein as being performed by the computing device 110 may be locally performed by the server 105. For example, in some examples, the server 105 may store the application 170, the feature tracking model(s) 175 (including the gaze tracking model 175A, the head tracking model 175B, etc.), the parameter database 180 (including the mapping 185), the user application(s) 165, or a combination thereof. Although not illustrated in FIG. 1, the server 105 may include similar components as the computing device 110, such as electronic processor (for example, a microprocessor, an ASIC, or another suitable electronic device), a memory (for example, a non-transitory, computer-readable storage medium), a communication interface, such as a transceiver, for communicating over the communication network 116 and, optionally, one or more additional communication networks or connections, and one or more HMIs.

Figure 3:
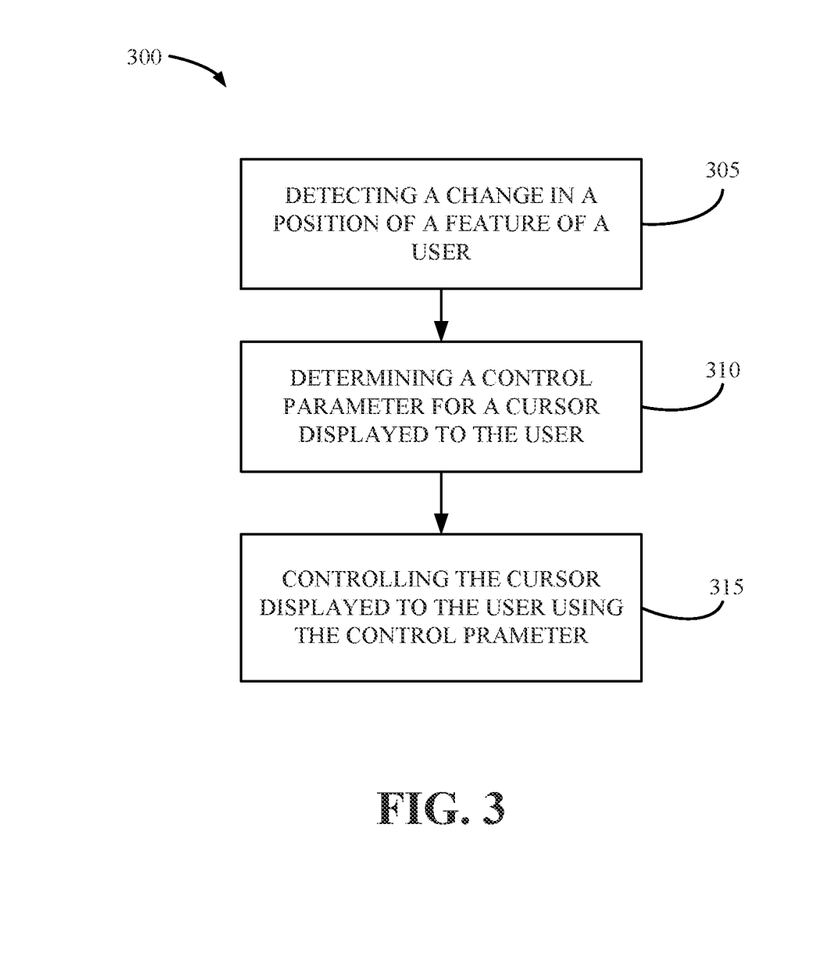
FIG. 3 is a flowchart illustrating a method for implementing adaptive cursor control according to some examples.

FIG. 3 is a flowchart illustrating a method 300 for implementing adaptive cursor control according to some configurations. The method 300 is described as being performed by the computing device 110 and, in particular, the electronic processor(s) 130 executing the application 170, the feature tracking model(s) 175, or a combination thereof. However, as noted above, the functionality described with respect to the method 300 can be performed by other devices, such as the server 105, another remote server or computing device, another component of the system 100, or a combination thereof, or distributed among a plurality of devices, such as a plurality of servers included in a cloud service (e.g., a web-based service executing software or applications).

As illustrated in FIG. 3, the method 300 includes detecting a change in a position of a feature of a user (at block 305). As noted herein, a feature of a user may include, e.g., an eye (or pair of eyes), a mouth, a body, a head, a hand, a finger, a limb, etc. In some examples, the feature of a user (or a position thereof) may be monitored using the image data collected by the imaging device(s) 155 may include information associated with the feature of the user, including, e.g., a position of the feature, etc. The electronic processor 130 may continuously monitor the feature(s) of a user. Alternatively, the electronic processor 130 may intermediately (or periodically) monitor the feature(s) of the user. Accordingly, in some examples, the electronic processor may detect the change in the position of the feature based on the image data collected (or detected) by the image device(s) 155.

In some examples, the electronic processor 130 may detect the change in position of the feature using the feature tracking model(s) 175 (e.g., providing the image data from the image device(s) 155 to the feature tracking model(s) 175). In some examples, when the feature is a head of the user, the electronic processor 130 may utilize the head tracking model 175B to detect a change in position with respect to the head of the user. For instance, the electronic processor 130 may use the head tracking model 175B to determine a change in head pose, including, e.g., a change in head pose angle. As another example, when the feature is an eye (or pair of eyes) of the user, the electronic processor 130 may utilize the gaze tracking model 175A to detect a change in position with respect to the eye (or pair of eyes) of the user. For instance, the electronic processor 130 may use the gaze tracking model 175A to determine a change in eye gaze for the user (e.g., or gaze position).

The electronic processor 130 may determine a control parameter for a cursor displayed to the user (at block 310). As noted herein, a control parameter for a cursor may include, a sensitivity, a speed, a primary button selection, a secondary button selection, a scroll parameter, a display parameter, a double-click speed parameter, a trail parameter, etc. In some examples, the control parameter is a speed parameter for controlling a speed at which the cursor displayed to the user via the display device 150 moves.

In some examples, the electronic processor 130 may determine the control parameter in response to detecting the change in the position of the feature. In some examples, the electronic processor 130 may select (or determine) the control parameter from a set of control parameters (e.g., control parameter(s) stored in the parameter database 180). As noted herein, the parameter database 180 may store a set of control parameters, including, e.g., a set of default or fixed control parameters. Accordingly, in some configurations, the electronic processor 130 may select or determine the control parameter from the control parameters stored in the parameter database 180.

In some examples, the control parameter is a static control parameter (e.g., a predetermined or fixed control parameter. In such examples, a user may set the control parameter. For instance, a user may set a static control parameter for controlling the cursor, such as, e.g., when the user is interacting with a particular application (e.g., the user application 165). Accordingly, in some examples, the electronic processor 130 may determine the control parameter based on an active application (e.g., an application being executed or interacted with by the user), such as, e.g., the user application(s) 165. As such, the electronic processor 130 may identify an active application (e.g., being interacted with by the user) and select the control parameter based on which application is active. In some examples, the electronic processor 130 may access the mapping 185 as part of determining the control parameter. As noted herein, the mapping 185 may associate at least one control parameter to a specific user application 165. The mapping 185 may be a look up table including a listing of user applications with corresponding cursor sensitivity settings, such as the example table 200 of FIG. 2.

In some examples, the control parameter may be a dynamic control parameter. For instance, in some examples, the electronic processor 130 may determine the control parameter based on a size (or magnitude) of the change of the position of the feature. The electronic processor 130 may determine the control parameter such that the control parameter is proportional to the change in the position of the feature. For example, where the control parameter is a speed parameter, the electronic processor 130 may determine a higher speed parameter when the change in position is large while the electronic processor 130 may determine a lower speed parameter when the change in position is small. Accordingly, the electronic processor 130 may determine a size of the change of the position of the feature (or another metric indicating the degree or level of change in the position). A size may represent a distance between two positions. For example, when the feature is an eye (or pair of eyes), the size may represent a distance between an original eye position (or gaze position) and a new eye position (or gaze position). As another example, when the feature is a head, the size may represent a change (or distance) between an original head pose angle and a new head pose angle.

Figure 4:
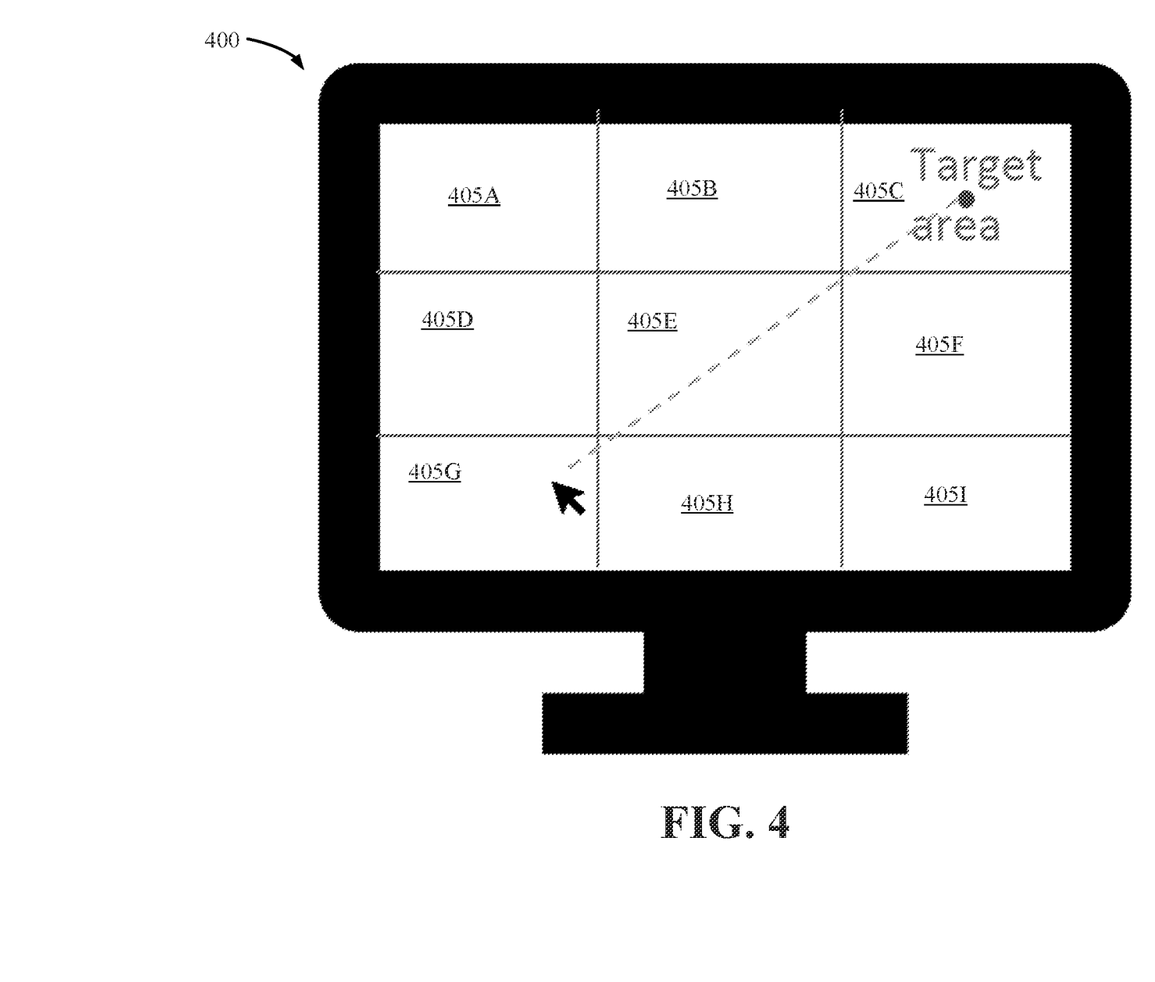
FIG. 4 illustrates an example display device with a displayable region divided into a plurality of regions according to some examples.

In some examples, the size of the change in the position may be associated with a change in display regions of the display device 150. FIG. 4 illustrates an example display device 400 according to some examples. As illustrated in FIG. 4, a displayable area of the display device 400 may be divided into a plurality of regions (e.g., a first region 405A, a second region 405B, a third region 405C, a fourth region 405D, a fifth region 405E, a sixth region 405F, a seventh region 405G, an eighth region 405H, and a ninth region 405I). For example, a user may be looking at or interacting with the a region of a displayable area of the display device 400 and then the user may shift their gaze to or interactions with a different region of the displayable area the display device 150. As illustrated in FIG. 4, the user may be focusing on (e.g., looking at) the seventh region 405G and may shift their attention (e.g., their eye gaze) to the third region 405C (represented in FIG. 4 as the target area). Accordingly, in some examples, the size of the change in position may relate to a change in a region of the displayable area of the display device 400 (e.g., the display device 150).

In some examples, the electronic processor 130 may utilize a threshold in determining the control parameter. The threshold may represent a size of the change in position that triggers a dynamic control parameter (e.g., a control parameter determined based on a size of the change in position) as opposed to a static control parameter (e.g., a control parameter that is predetermined or fixed). For example, a change in position that is minor (e.g., a smaller sized change in position) may not warrant changing a control parameter of the cursor while a change in position that is greater (e.g., a larger sized change in position) may warrant changing a control parameter of the cursor. As such, in some examples, the electronic processor 130 compare the size of change in the position of the feature to a threshold. When the size of the change in the position of the feature exceeds (or otherwise satisfies) the threshold (indicating that a control parameter change may be warranted), the electronic processor 130 may determine the control parameter dynamically (e.g., based on the size of the change in the position of the feature, where the control parameter may be proportional to the size of the change in the position of the feature). When the size of the change in the position of the feature does not exceed (or otherwise does not satisfy) the threshold (indicating that a control parameter change may not be warranted), the electronic processor 130 may determine the control parameter as a static control parameter (e.g., using the mapping 185 to determine a predetermined or fixed control parameter, such as, e.g., based on an active application).

In some examples, the electronic processor 130 may determine a control mode for controlling the cursor. A control mode may be a dynamic control mode, where the electronic processor 130 determines the control parameter dynamically (e.g., based on a change in the position of the feature), or a static control mode, where the electronic processor 130 determines the control parameter as a static control parameter based on an active application. The electronic processor 130 may determine the control mode based on which application is active. In some configurations, the mapping 185 may indicate a control mode associated an active application. For instance, as illustrated in FIG. 2, the table 200 may include a static or fixed control parameter, which may ultimately indicate a static control mode for the associated application. Alternatively, as illustrated in FIG. 2, the table 200 may indicate a dynamic or adaptive control mode, where the electronic processor 130 may determine the control parameter dynamically based on a size of the change in the position of the feature.

The electronic processor 130 may control the cursor displayed to the user using the control parameter (at block 315). The electronic processor 130 may control how the cursor is displayed based on the control parameter. For instance, when the control parameter is a speed parameter (or an adjusted speed parameter), the electronic processor 130 may control a speed at which the cursor moves.

In some examples, the electronic processor 130 may detect when a change in the position of the feature is complete (e.g., when a change in head pose angle or a change in eye gaze is completed). When the electronic processor 130 detects that the change in the position of the feature is complete, the electronic processor 130 may set the control parameter to a default or fixed control parameter. Accordingly, in some examples, the electronic processor 130 may dynamically adjust a control parameter in response to a motion of the feature and, once the motion of the feature is completed, the electronic processor 130 may control the cursor using a static control parameter. For instance, the movement of the feature may have an end position or location. The electronic processor 130 may control the cursor using the dynamically adjusted control parameter while the cursor travels to the end position or location of the movement. Once the cursor achieves (or substantially achieves the end position or location of the movement, the electronic processor 130 may control the cursor using a default or fixed control parameter (e.g., a static control parameter).

Figure 5:
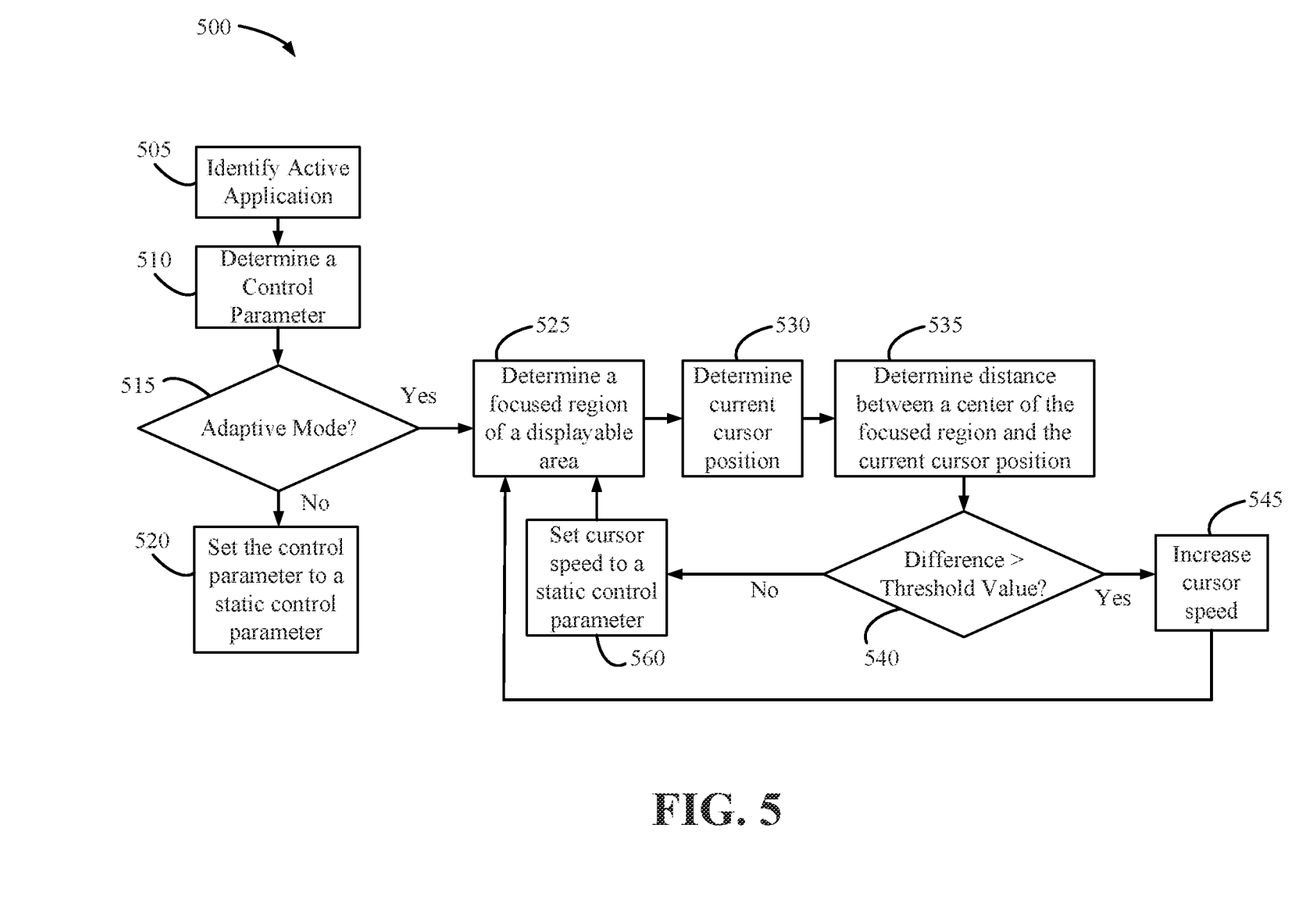
FIG. 5 is a flowchart illustrating a method for implementing adaptive cursor control using eye gaze according to some examples.

FIG. 5 is a flowchart illustrating an example method 500 of adaptively controlling a cursor based on eye gaze according to some examples. The method 500 may be a particular example of the process illustrated in FIG. 3. The method 500 is described as being performed by the computing device 110 and, in particular, the electronic processor(s) 130 executing the application 170, the gaze tracking model 175A, or a combination thereof. However, as noted above, the functionality described with respect to the method 500 can be performed by other devices, such as the server 105, another remote server or computing device, another component of the system 100, or a combination thereof, or distributed among a plurality of devices, such as a plurality of servers included in a cloud service (e.g., a web-based service executing software or applications).

As illustrated in FIG. 5, the method 500 may include identifying an active application (at block 505). In some examples, the electronic processor 130 may detect a change in a focused application (e.g., active application). A focused or active application may refer to the user application 165 in which the user is actively interacting with or that is being executed on the computing device 110. For example, the active application may be the application with a graphical user interface (GUI) currently displayed on a display device 150, the application with which the user most recently input data or a command (e.g., via a keyboard, a mouse, etc.), the application with a GUI that is in a foreground of a display device 150 displaying multiple GUIs for respective applications in a layered manner, or the like. After identifying the active application (at block 505), the electronic processor 130 may determine a control parameter for the cursor based on the active application (at block 510). As described in greater detail herein, the electronic processor 130 may determine the control parameter based on the mapping 185 (or a table associating user applications 165 to control parameters). In some examples, the electronic processor 130 determines whether the active application is associated with an adaptive mode (at block 515). When the active application is not associated with an adaptive mode (No at block 515), the electronic processor 130 may set the control parameter for the cursor to a static control parameter associated with the active application (e.g., as associated in the mapping 185 or another table) (at block 520).

When the active application is associated with an adaptive mode (Yes at block 515), the electronic processor 130 may dynamically determine the control parameter. For instance, as illustrated in FIG. 5, the electronic processor 130 may determine a focused region of a displayable area of the display device 150 (at block 525), as similarly described herein with respect to FIG. 4. In some examples, the electronic processor 130 may determine the focused region using a gaze direction model (e.g., the gaze tracking model 175A). The focused region may be a region of the displayable area of the display device 150 in which the user is focusing or interacting with (e.g., looking at). The electronic processor 130 may determine a current cursor position (at block 530). The electronic processor 130 may determine a distance between a center of the focused region and the current cursor position (at block 535). The electronic processor 130 may compare the distance to a threshold value (at block 540). When the distance is greater than (or equal to) the threshold value (Yes at block 540), the electronic processor 130 may increase a cursor speed (e.g., as the control parameter) (at block 545). When the distance is less than the threshold value (No at block 540), the electronic processor 130 may set the cursor speed to a static control parameter associated with the active application (e.g., as associated in the mapping 185 or another table) (at block 560). In some examples, the static control parameter may be a default or predetermined cursor speed.

In some examples, the electronic processor 130 may decrease the cursor speed, such as, e.g., after increasing the cursor speed at block 545. For example, the electronic processor 130 may decrease the cursor speed after a predetermined period of time lapses (e.g., after one minute of increased cursor speed). As another example, the electronic processor 130 may decrease the cursor speed after detecting completion of a movement, as described in greater detail herein. In some examples, the electronic processor 130 may repeat one or more steps in the method 500. For example, the electronic processor 130 may initiate the method 500 each time a new active application is identified (e.g., at block 505). As another example, in some instances, the electronic processor 130 may monitor a focused region of a displayable area after increasing the cursor speed (e.g., at block 545). For instance, as illustrated in FIG. 5, the method 500 may return to block 525 after increasing the cursor speed at block 545.

Figure 6:
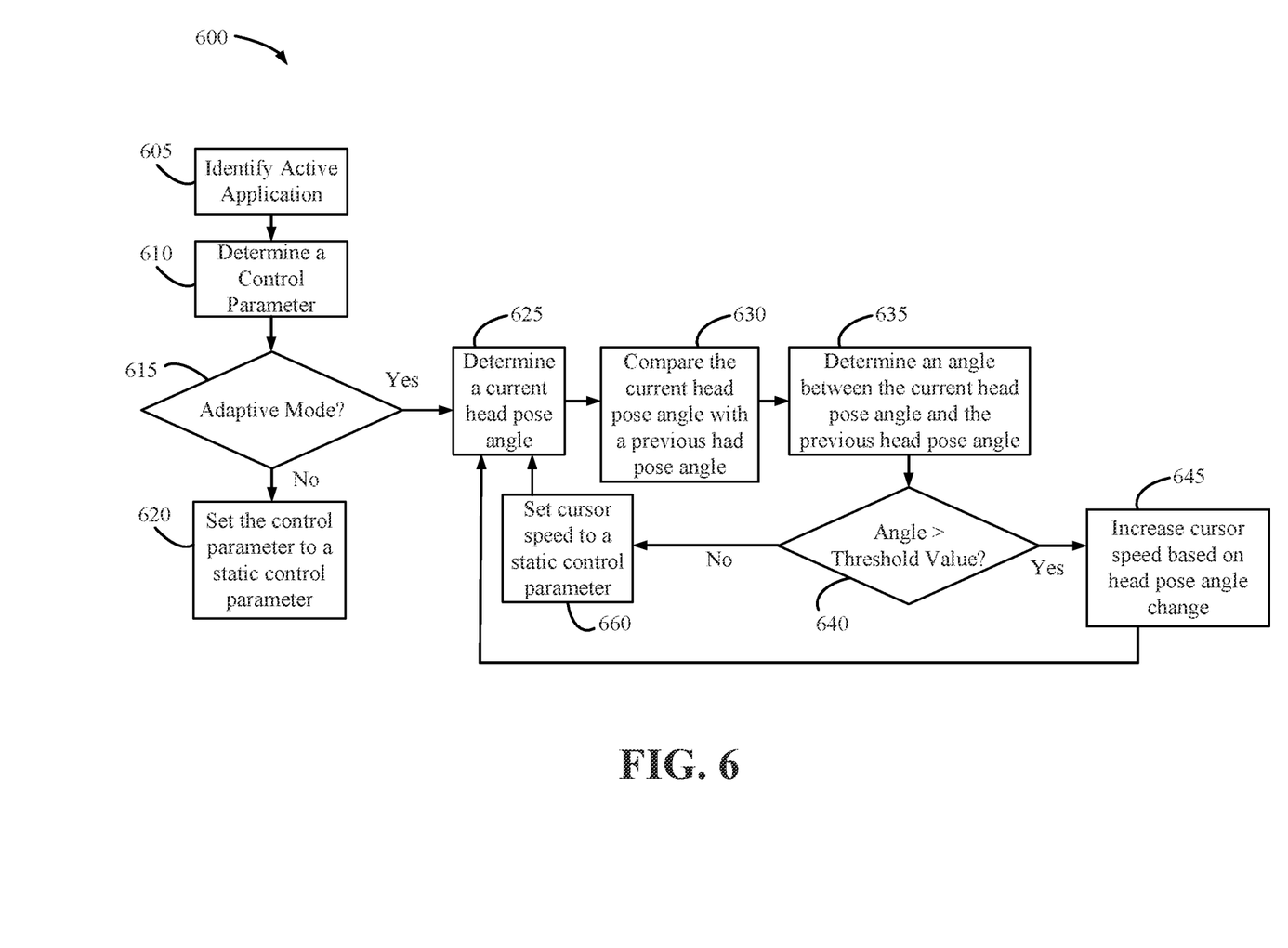
FIG. 6 is a flowchart illustrating a method for implementing adaptive cursor control using head position according to some examples.

FIG. 6 is a flowchart illustrating an example method 600 of adaptively controlling a cursor based on head pose according to some examples. The method 600 may be a particular example of the process illustrated in FIG. 3. The method 600 is described as being performed by the computing device 110 and, in particular, the electronic processor(s) 130 executing the application 170, the head tracking model 175B, or a combination thereof. However, as noted above, the functionality described with respect to the method 600 can be performed by other devices, such as the server 105, another remote server or computing device, another component of the system 100, or a combination thereof, or distributed among a plurality of devices, such as a plurality of servers included in a cloud service (e.g., a web-based service executing software or applications).

As illustrated in FIG. 6, the method 600 may include identifying an active application (at block 605), determining a control parameter (at block 610), determining whether the active application is associated with an adaptive mode (at block 615), as similarly described herein with respect to blocks 505, 510, and 515 of the method 500. Similar to block 520 of the method 500, when the active application is not associated with an adaptive mode (No at block 615), the electronic processor 130 may set the control parameter to a static control parameter (at block 620).

When the active application is associated with an adaptive mode (Yes at block 615), the electronic processor 130 may dynamically determine the control parameter. For instance, as illustrated in FIG. 6, the electronic processor 130 may determine a current head pose angle of the user (at block 625). In some examples, the electronic processor 130 may determine the current head pose angle using a head direction model (e.g., the head tracking model 175B). The electronic processor 130 may compare the current head pose angle to a previous head pose angle (at block 630). The electronic processor 130 may determine an angle between the current head pose angle and the previous head pose angle (at block 635). The electronic processor 130 may compare the angle to a threshold value (at block 640). When the angle is less than the threshold value (No at block 640), the electronic processor 130 may set the cursor speed to a static control parameter associated with the active application (e.g., as associated in the mapping 185 or another table) (at block 660). In some examples, the static control parameter may be a default or predetermined cursor speed. When the angle is greater than (or equal to) the threshold value (Yes at block 640), the electronic processor 130 may increase a cursor speed (e.g., as the control parameter) based on head pose angle change (at block 645).

Figure 7:
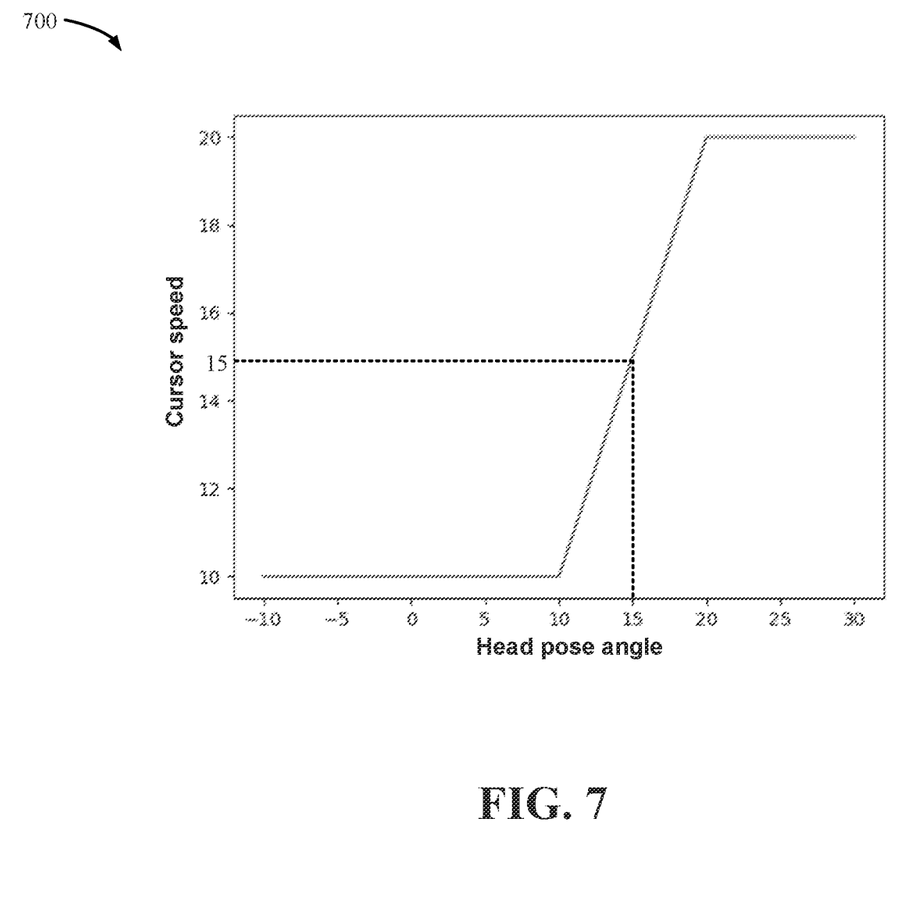
FIG. 7 is a graph illustrating a relationship between head pose angle and cursor speed according to some examples.

For example, FIG. 7 illustrates a graph 700 illustrating a relationship between cursor speed (e.g., a speed parameter, as the control parameter) and a head pose angle (e.g., a head position). As illustrated in FIG. 7, in some examples, the electronic processor 130 may determine the control parameter to be a cursor speed of 10 when the change in head pose angle (e.g., the angle determined at block 635) is less than (or equal to) 10 degrees. In some examples, the electronic processor 130 may determine the control parameter to be a cursor speed of 20 when the change in head pose angle (e.g., the angle determined at block 635) is greater than (or equal to) 20 degrees. In some examples, the electronic processor 130 may determine the control parameter to be a cursor speed of 15 when the change in head pose angle (e.g., the angle determined at block 635) is 15.

In some examples, the electronic processor 130 may decrease the cursor speed, such as, e.g., after increasing the cursor speed at block 645. For example, the electronic processor 130 may decrease the cursor speed after a predetermined period of time lapses (e.g., after one minute of increased cursor speed). As another example, the electronic processor 130 may decrease the cursor speed after detecting completion of a movement, as described in greater detail herein. In some examples, the electronic processor 130 may repeat one or more steps in the method 600. For example, the electronic processor 130 may initiate the method 600 each time a new active application is identified (e.g., at block 605). As another example, in some instances, the electronic processor 130 may monitor a current head pose angle after increasing the cursor speed (e.g., at block 645). For instance, as illustrated in FIG. 6, the method 600 may return to block 625 after increasing the cursor speed at block 645.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodied on a non-transitory computer-readable media, such that a processor device can implement the instructions based upon reading the instructions from the computer-readable media. Some examples of the technology can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the FIGs. or otherwise discussed herein. Unless otherwise specified or limited, representation in the FIGs. of particular operations in particular spatial order can not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular examples of the technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Although the present technology has been described by referring to preferred examples, workers skilled in the art will recognize that changes can be made in form and detail without departing from the scope of the discussion.

What is claimed is:

1. A system, comprising:
   a camera to detect an image data stream including a feature of a user; and
   an electronic processor to:
      identify an active application being executed;
      detect, via a feature tracking model that receives the image data, a change in a position of the feature;
      in response to detecting the change in the position of the feature, determine, based on the change in the position of the feature, a control parameter for a cursor displayed to the user, wherein the cursor is displayed as a graphical indicator representative of user input provided via a mouse, wherein when the active application is associated with an adaptive mode, the control parameter is dynamically determined based on a size of the change in the position of the feature, the control parameter being proportional to the size of the change in position of the feature; and
      control, responsive to user input provided via the mouse, movement of the cursor displayed to the user such that the movement of the cursor is in accordance with the control parameter.

2. The system of claim 1, wherein the control parameter is a rate of movement that the cursor will move in response to a given input.

3. The system of claim 1, wherein the feature includes an eye of the user and the change in the position of the feature is associated with a change in eye gaze of the user.

4. The system of claim 1, wherein the feature includes a head of the user and the change in the position of the feature includes a change in head pose angle of the user.

5. The system of claim 1, wherein the electronic processor:
   selects, based on the active application, the control parameter from a set of control parameters.

6. The system of claim 1, wherein the electronic processor:
- detects when the change in the position of the feature is complete; and
- when the change in the position of the feature is complete, controls the cursor displayed to the user based on the control parameter.

7. The system of claim 1, wherein the control parameter is a dots per linear inch (DPI) value.

8. The system of claim 1, wherein the electronic processor is configured to determine the control parameter based on a mapping associating the control parameter to an active application being executed by the user.

9. The system of claim 1, wherein the size of the change in position represents an amount of change between a first head pose angle and a second head pose angle.

10. The system of claim 5, wherein the electronic processor:
- detects a change in focus for the user from the active application to a second active application;
- selects, based on the second active application, a third control parameter from the plurality of control parameters, wherein the plurality of control parameters includes the first control parameter, the second control parameter, and the third control parameter, wherein the third control parameter is different from both the first control parameter and the second control parameter; and
- controls the cursor displayed to the user using the third control parameter.

11. The system of claim 1, wherein the electronic processor is configured to determine the control parameter to be a first speed parameter when the size of the change in the position of the feature is a first size and a second speed parameter when the size of the change in the position of the feature is a second size, wherein the first speed parameter is different from the second speed parameter and the first size is different from the second size.

12. A method, comprising:
- receiving, via a camera, image data that includes a feature of a user;
- identifying an active application being executed;
- detecting, via a feature tracking model that receives the image data, a change in a position of the feature;
- in response to detecting the change in the position of the feature, determining a control parameter for a cursor displayed to the user, wherein the control parameter includes a speed parameter, wherein the cursor is displayed as a graphical indicator representative of user input provided via a mouse, and wherein, when the active application is associated with the adaptive mode, dynamically determine the control parameter based on a size of the change in the position of the feature, the control parameter being proportional to the size of the change in the position of the feature; and
- controlling, by a processor, the cursor displayed to the user using the control parameter.

13. The method of claim 12, further comprising:
- determining the size of change in the position of the feature.

14. A non-transitory computer-readable medium storing instructions that, when executed by an electronic processor cause the electronic processor to:
- receive, via a camera, image data that includes a feature of a user;
- identify an active application being executed;
- determine whether the active application is associated with an adaptive mode;
- detect, via a feature tracking model that receives the image data, a change in a position of the feature;
- in response to detecting the change in the position of the feature, determine, based on whether the active application is associated with the adaptive mode, a control parameter for a cursor displayed to the user, wherein the control parameter includes a speed parameter, and wherein the cursor is displayed as a graphical indicator representative of user input provided via a mouse, and wherein, when the active application is associated with the adaptive mode, the control parameter is dynamically determined based on a size of the change in the position of the feature, the control parameter being proportional to the size of the change in the position of the feature; and
- control the cursor displayed to the user using the control parameter.

15. The computer-readable medium of claim 14, wherein the instructions, when executed by the electronic processor, cause the electronic processor to:
- when the active application is not associated with the adaptive mode, select the control parameter from a set of control parameters, wherein the control parameter is a static control parameter.

* * * * *